United States Patent [19]

Fujitani et al.

[11] 4,399,094

[45] Aug. 16, 1983

[54] PROCESS AND APPARATUS FOR FORMING A PLASTIC FILM

[75] Inventors: Shigeo Fujitani; Youichi Matsuda, both of Yokohamashi, Japan

[73] Assignee: Union Carbide Corporation, Danbury, Conn.

[21] Appl. No.: 267,353

[22] Filed: May 26, 1981

[30] Foreign Application Priority Data

May 30, 1980 [JP] Japan .................................. 55-72587

[51] Int. Cl.³ .............................................. B29D 7/22
[52] U.S. Cl. .................... 264/566; 264/567; 264/569; 425/72 R; 425/326.1
[58] Field of Search ....................... 264/569, 564–566; 425/326.1, 72 R

[56] References Cited

U.S. PATENT DOCUMENTS

| | | | |
|---|---|---|---|
| 3,167,814 | 2/1965 | Corbett | 264/569 |
| 3,221,084 | 11/1965 | Peticolas | 425/72 R |
| 3,243,486 | 3/1966 | Pilaro | 264/569 |
| 3,307,218 | 3/1967 | Reifenhauser | 425/326.1 |
| 3,363,035 | 1/1968 | Niiho et al. | 264/568 |
| 3,548,042 | 12/1970 | Hinrichs | 264/569 |
| 3,888,609 | 6/1975 | Saint Eve et al. | 264/569 |
| 4,330,501 | 5/1982 | Jones et al. | 264/569 |

FOREIGN PATENT DOCUMENTS

| | | | |
|---|---|---|---|
| 1183229 | 5/1962 | Fed. Rep. of Germany | 425/326.1 |
| 2725832 | 12/1978 | Fed. Rep. of Germany | 425/326.1 |
| 37-12525 | 5/1959 | Japan . | |
| 38-24593 | 10/1959 | Japan . | |
| 45-26237 | 8/1970 | Japan | 425/72 R |
| 47-4947 | 2/1972 | Japan . | |
| 52-12791 | 3/1977 | Japan . | |
| 53-8339 | 3/1978 | Japan . | |
| 54-8390 | 4/1979 | Japan . | |

Primary Examiner—Jeffery R. Thurlow
Attorney, Agent, or Firm—Clement J. Vicari

[57] ABSTRACT

A plastic film is formed by annealing a molten tubular film in a first enclosed space and immediately thereafter directing cold air perpendicular to the axis thereof and expanding and solidifying the film in a second enclosed space while in contact with cold air flowing parallel to film travel.

6 Claims, 3 Drawing Figures

PROCESS AND APPARATUS FOR FORMING A PLASTIC FILM

The present invention relates to an improved process and apparatus for forming a plastic film from a thermoplastic resin by blown-film extrusion.

The production of tubular films by blown-film extrusion includes the steps of extruding a resin, which has been melted in an extruder, in the form of a tube from a circular die, cooling and solidifying the tubular film, which has been blown immediately after extrusion, by blowing cold air to the outer surface of the tubular film, and taking up the tubular film by means of pinch rolls. Plastic films produced by this method find wide uses for packaging, building and construction, and agriculture.

There are many instances where even a slight improvement in clarity is desirable for plastic films, since the improvement in clarity leads to added value of plastic films. In spite of comparatively good clarity, low density polyethylene is not acceptable in many sectors of the market where polypropylene is prevailing, the latter prevailing because it is best in clarity among general-purpose resins although it is highly priced.

The improvement in clarity and gloss of blown tubular films made by blown-film extrusion is a problem long awaiting solution. As a means to solve this problem there is proposed, for example, the installation of a chimney or cylindrical body in which the tubular film emerging from the die is kept hot or heated. (Japanese Patent Publication Nos. 37-12525 and 38-24593) This method, however, is not applicable to commercial production because when the chimney is combined with a conventional air ring, cooling is not enough to improve the physical properties of the resulting film, process stability is not satisfactory, and productivity is too low. On the other hand, a number of methods to intensify cooling were proposed and some of them have been put into practical use as "high-speed blow-film extrusion process" in order to meet the market requirements for cost reduction. There is proposed, for example, a process to cool intensively and stabilize the blown tube by means of an internally finned air flow rectifying cylinder which is placed off the air ring. (Japanese Patent Publication No. 47-4947) There are proposed, further, improved processes to intensify cooling by the use of an expanding cylinder which rectifies the air flow in the direction of the tubular film travel and introduces thereinto the secondary cooling air through the opening between the cylinder and the air ring. (Japanese Utility Model Publication No. 52-12791 and Japanese Patent Publication Nos. 53-8339 and 54-8390) These prior art references disclose the processes which increase the cooling air flow and obviate the instability of tubular film, making high-speed forming possible to some extent. In fact, some of these processes have successfully improved the resulting films in mechanical properties, but none of them is able to improve in optical properties, particularly clarity, to a great extent.

It is an object of this invention to provide a process and apparatus for producing in high efficiency tubular films of high clarity from thermoplastic resins by blown-film extrusion.

The process of this invention is characterized by subjecting the molten tubular film extruded from a die to annealing in a first enclosed space, immediately thereafter blowing cold air for rapid cooling to the outer surface of said tubular film in the direction perpendicular to the axis thereof, and permitting said tubular film to expand and solidify in a second enclosed space while it is in contact with cold air flowing in the same direction as said tubular film travel.

BRIEF DESCRIPTION OF THE DRAWINGS

Referring to FIG. 1, extruder 1 is provided with a die 2 having an air port 4 and a die lip 3 from which a molten tube 5 is extruded. An annealing chamber 6, a cylindrical body measuring 150 to 700 mm in height and having a diameter 1.1 to 5 times that of the die lip 3, is placed at the exit of the die 2 concentrically with the molten tube 5 being extruded from the die lip 3 and in airtight contact with the die 2. An air ring 7 is placed at the exit of the annealing chamber 6 concentrically with and in airtight contact with the annealing chamber 6. An air flow rectifying cylinder 11 is placed on the air ring 7. Guide plates 13 and pinch rolls 14 are provided to take up the coolec tubular film. The air ring 7 is provided with air inlets 12 at proper positions on its periphery. The lower plate ring 8 and the upper plate ring 9 form a horizontal circular air passage 17 ending with a blow-off slit 16 from which cold air is blown off at right angles with the axis of the tubular film 5. The upper plate ring 9 has an aperture 10, which is a plurality of slits and/or small holes 15, at the part encircled by the air flow rectifying cylinder 11 placed thereon. This aperture should preferably be adjustable for their opening. The upright air flow rectifying cylinder 11, measuring 150 to 500 mm in height and having a diameter 1.5 to 6.5 times that of the die lip, is placed airtight on the upper plate ring 9 of the air ring. Needless to say, the air flow rectifying cylinder should be installed in such a manner that the blown film does not come into contact with it while travelling therein and that the tubular film is not subjected to an excessive expanding force caused by Venturi effect. Guide rolls are installed before the pinch rolls 14, as the case may be, to stabilize the tubular film.

Figure 1:
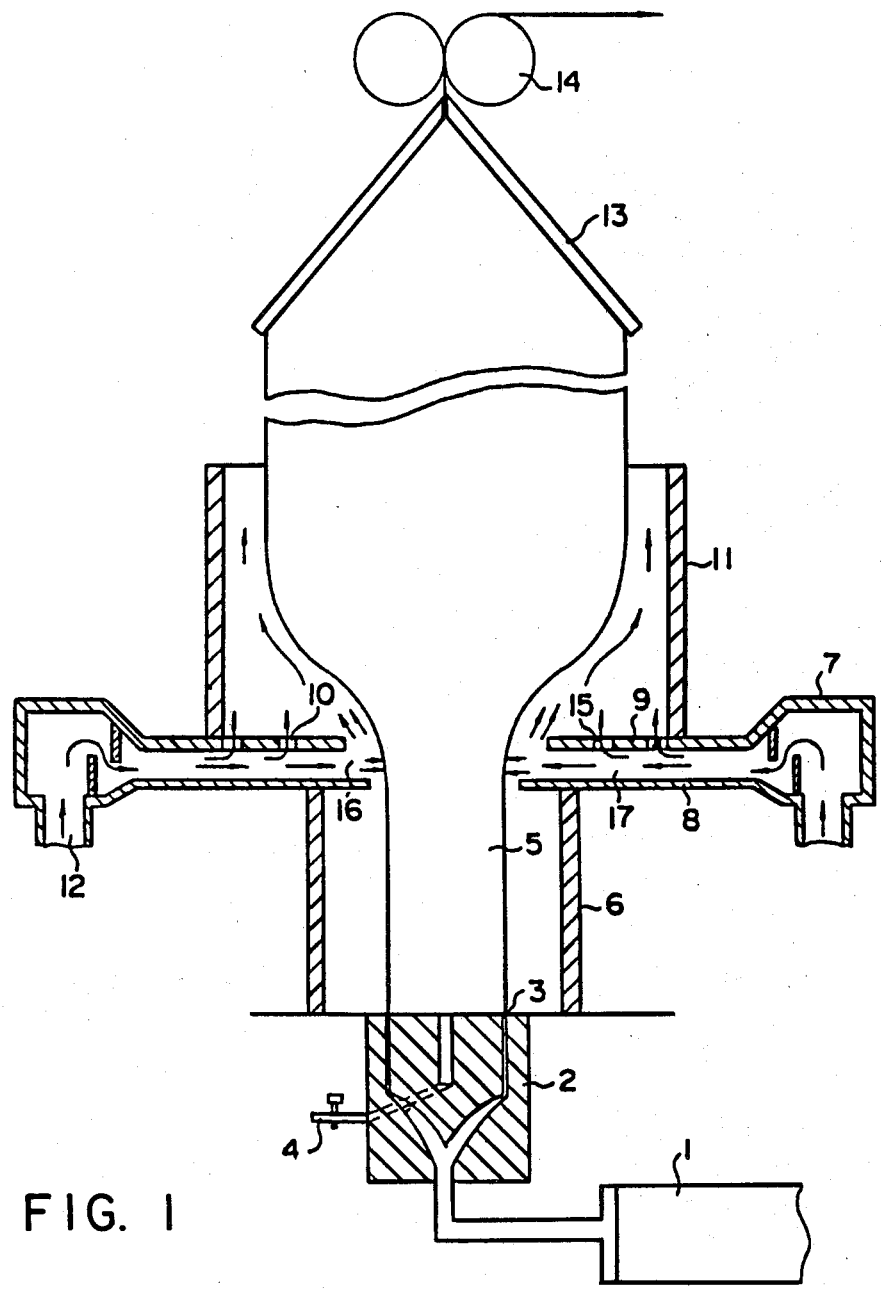
FIG. 1 is a sectional view of the apparatus of this invention.

The film forming process according to this invention is accomplished by the use of the apparatus as mentioned above. In the process, the molten tubular film 5 extruded from the die lip 3 is allowed to pass the annealing chamber 6, in which the film is kept hot or cooled gradually so that the surface smoothness is improved, with little change in dimensions. As soon as the molten tubular film 5 crosses the upper end of the annealing chamber 6, it is cooled rapidly by a large volume of cooling air blowing from the blow-off slit 16 of the air ring 7, at right angles with the axis of the tube. Simultaneously, the molten tubular film 5 is expanded by the pressure of the air introduced thereinto from the air port 4. The expanded tubular film is further cooled and solidified, as it travels, by the cooling air which is supplied from the aperture 10 and is allowed to flow along the tubular film. Finally, the solidified tubular film is taken up by the pinch rolls 14.

The film produced by the above-mentioned process is very good in clarity as compared with blown tube films generally available on the market. The improvement in clarity accomplished by the process of this invention is contradictory to the past experience that blowing air perpendicular to the tubular film is not favorable. This past experience, however, turned out to be groundless as the result of more accurate maching of the air ring which has come available recently and as the result of the combination ofthe air flow rectifying cylinder and the cooling air which is blown in the parallel direction with the tubular film travel from the aperture made on the upper plate ring. The high-clarity film obtained according to the process of this invention is considered to be the result of the synergistic effects of (1) intensified cooling by air emerging from the above-mentioned aperture, (2) improved stability of the tubular film accomplished by the air flow rectifying cylinder, (3) rapid cooling accomplished by perpendicular blowing of air, and (4) rapid removal of warmed waste air generated as the result of film cooling.

In view of the fact that there are many application areas where low density polyethylene is not accepted only because it is inferior in clarity to other plastics although it has many outstanding characteristics, the present invention is of great significance in that low density polyethylene can be made competitive with other plastics with respect to clarity.

EXAMPLES

EXAMPLE 1

A tubular film was produced by using a 40 mm extruder equipped with the apparatus of this invention as shown in FIG. 1 under the processing conditions listed below:

Diameter of circular die slit: 75 mm
Annealing chamber: 200 mm high, 285 mm mm in diameter
Air ring: The upper plate ring has 15 small holes.
Position of frost line: Immediately above the air ring.
Air flow rectifying cylinder: 300 mm in diameter, 200 mm high
Flow ratio of air from the blow-off slit of air ring to air from the holes on the upper ring of air ring: 12:1
Air velocity at blow-off slit of air ring: 6.2 m/sec.
Temperature of cooling air: 20° C.
Film take-up speed: 12 m/min.
Blow-up ratio: 2.0
Film thickness: 0.04 mm
Raw material: Low density polyethylene NUC-8150 (made by Nippon Unicar Company Limited) having melt index 2.4 and density 0.924

The haze and gloss, which are criteria for optical characteristics, of the resulting film are shown in Table 1.

COMPARATIVE EXAMPLE 1

Figure 2:
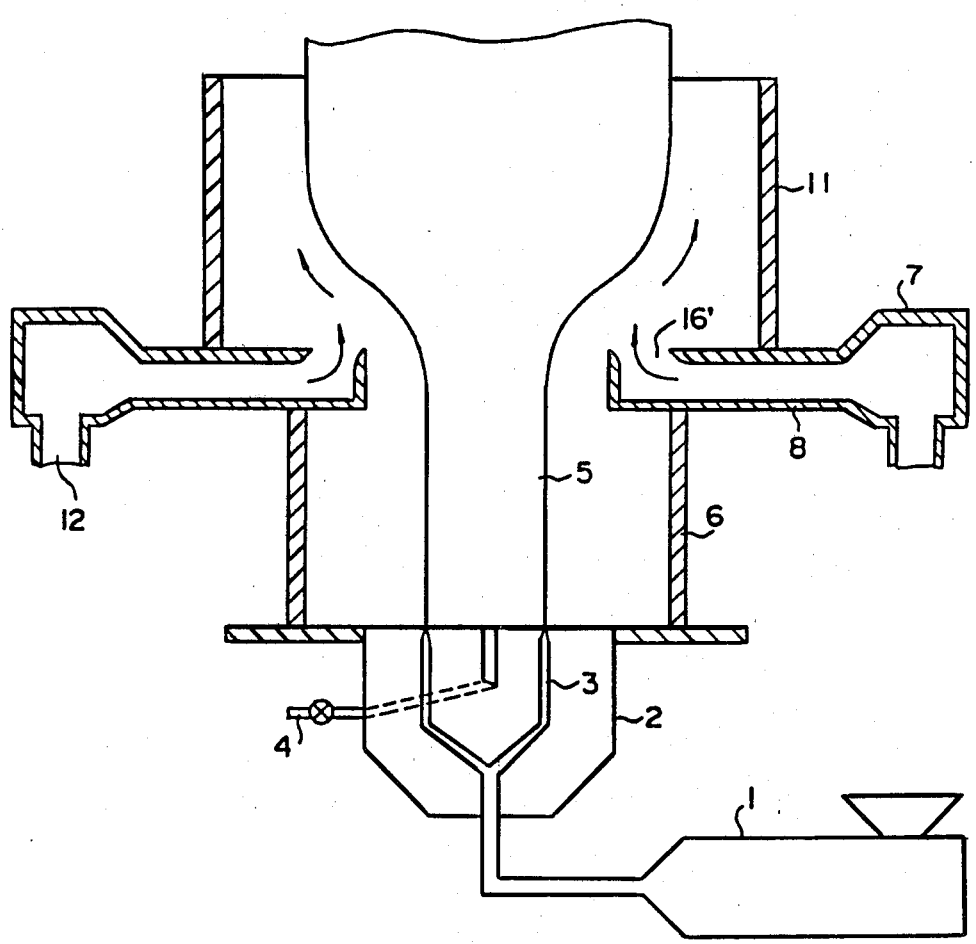
FIG. 2 is a sectional view of a film forming apparatus provided with a parallel flow type air ring.

A tubular film was produced under the same processing conditions as in Example 1, except that the blow-off slit of the air ring was modified as shown in FIG. 2. The modified blow-off slit is a so-called parallel flow type (which blows off cooling air in the direction parallel with the tubular film travel), which is said to give good results according to known literature. Contrary to expectation, the resulting film was apparently poorer in haze than that obtained in Example 1. As far as haze is concerned, the air ring used in this comparative Example 1 is better than the conventional one; but it does not improve the film gloss shown in Table 1. The low gloss made the resulting film look poor in clarity to the naked eye.

COMPARATIVE EXAMPLE 2

A tubular film was produced under the same processing conditions as in Example 1, with the annealing chamber and air flow rectifying cylinder removed and the air ring replaced by the parallel flow type in widespread use. The resulting film had a haze value of 5.2, which falls under a good category for commercial low density polyethylene films.

EXAMPLE 2-8

Example 1 was repeated using different types of resins under somewhat different conditions. Extrusion temperature was changed to 170° C. in Examples 5 and 6 and 150° C. in Example 7. (It remained at 160° C. for other examples.) NUC-8150, -8506, -8008, and DFD-0118 are all low density polyethylene produced by Nippon Unicar Company Limited. NUC-3530 is an ethylene-vinyl acetate copolymer produced by Nippon Unicar. Ultzex is an ethylene copolymer produced by Mitsui Petrochemicals. DGFA-7043 and -7042 are also ethylene copolymers produced by Union Carbide.

COMPARATIVE EXAMPLES 3-9

Blown tube films were produced from several kinds of resins using the same apparatus under the same conditions as in Comparative Example 2.

In these examples, haze, gloss, melt index, and density were measured according to ASTM D-1003, ASTM D-2457, ASTM D-1238, and ASTM D-1505, respectively. Air velocity was measured with an electronic anemometer produced by Shinkokusai Dengyo.

The results are indicated in Table 1.

Figure 3:
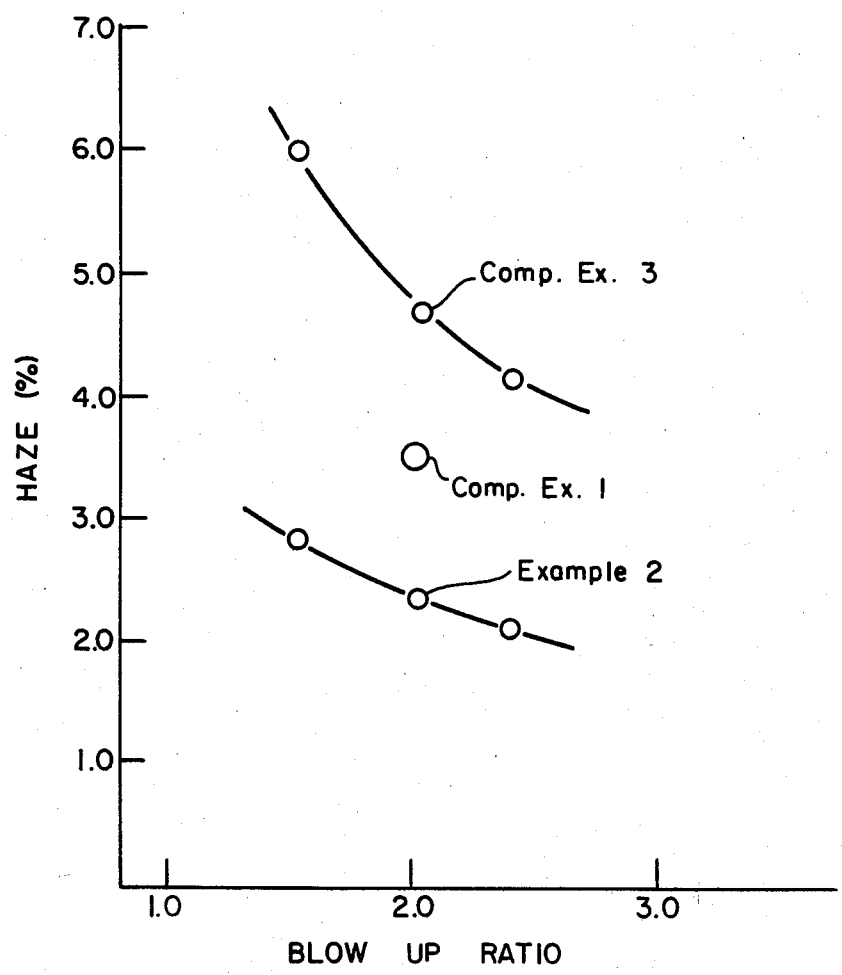
FIG. 3 is a graph showing the relationship between flow-up ratio and haze.

In the meantime, FIG. 3 shows the relationship between blow-up ratio and haze observed in Example 2 and Comparative Examples 1 and 3.

TABLE 1

|  | Resins Used | Density (g/ml) | Melt Index (g/10 min) | Haze (%) | Gloss (45°) |
| --- | --- | --- | --- | --- | --- |
| Example 1 | NUC-8150 | 0.924 | 2.4 | 2.6 | 79.0 |
| Comp. Ex 1 | NUC-8150 | 0.924 | 2.4 | 3.5 | 68.0 |
| Comp. Ex. 2 | NUC-8150 | 0.924 | 2.4 | 5.2 | 69.0 |
| Example 2 | NUC-8506 | 0.923 | 0.8 | 2.4 | 80.2 |
| Comp. Ex. 3 | NUC-8506 | 0.923 | 0.8 | 5.3 | 66.8 |
| Example 3 | NUC-3530 | 0.927 | 0.5 | 3.1 | 70.0 |
| Comp. Ex. 4 | NUC-3530 | 0.927 | 0.5 | 6.5 | 62.0 |
| Example 4 | Ultzex 2020L | 0.919 | 2.0 | 4.0 | 66.0 |
| Comp. Ex. 5 | Ultzex 2020L | 0.919 | 2.0 | 8.3 | 59.0 |
| Example 5 | DFGA-7043 | 0.922 | 2.9 | 8.2 | 60.0 |
| Comp. Ex. 6 | DFGA-7043 | 0.922 | 2.9 | 15.1 | 45.0 |
| Example 6 | DFGA-7042 | 0.922 | 2.2 | 7.3 | 61 |
| Comp. Ex. 7 | DFGA-7042 | 0.922 | 2.2 | 14.2 | 56 |
| Example 7 | NUC-8008 | 0.916 | 5.0 | 9.0 | 53 |
| Comp. Ex. 8 | NUC-8008 | 0.916 | 5.0 | 18.0 | 30 |
| Example 8 | DFD-0118 + HDPE 5% | 0.924 | 2.4 | 3.5 | 75 |
| Comp. Ex. 9 | DFD-0188 + HDPE 5% | 0.924 | 2.4 | 8.0 | 61 |

What is claimed is:

1. In a process for forming a plastic film from a thermoplastic resin by blow-film extrusion, the improvement which comprises subjecting the molten tubular film extruded from a die to annealing in a first enclosed space, immediately thereafter blowing cold air for rapid cooling to the outer surface of said tubular film in the direction perpendicular to the axis thereof, and permitting said tubular film to expand and solidify in a second enclosed space, while it is in contact with cold air flowing in the same direction as said tubular film travel.

2. The process for forming a plastic film as set forth in claim 1, wherein the thermoplastic resin is a polyolefin or an olefin copolymer.

3. The process for forming a plastic film as set forth in claim 1, wherein the thermoplastic resin is one consisting mainly of low density polyethylene or an ethylene copolymer having a density lower than 0.94.

4. The process for forming a plastic film as set forth in claim 1, wherein the blow-up ratio of said tubular film is 1 to 5.

5. An apparatus for forming a plastic film which comprises a molten resin extrusion die having a circular die lip and an air port, an annealing chamber of cylindrical body installed concentrically outside said die lip, an air ring which is installed in contact with said annealing chamber and is provided with a blow-off slit which opens horizontally at the end of a circular air passage and with apertures of slits and/or holes formed on the upper plate ring thereof, and an air flow rectifying cylindrical body installed outside said apertures on said upper plate ring.

6. The apparatus as set forth in claim 5, wherein said apertures formed on the upper plate ring of the air ring are adjustable for their opening.

* * * * *

UNITED STATES PATENT AND TRADEMARK OFFICE
CERTIFICATE OF CORRECTION

PATENT NO. : 4,399,094
DATED : August 16, 1983
INVENTOR(S) : S. Fujitani et al

It is certified that error appears in the above—identified patent and that said Letters Patent is hereby corrected as shown below:

IN THE TITLE PAGE

Change Assignee: "Union Carbide Corporation, Danbury, Conn." to Assignee: -- Nippon Unicar Company Limited, Tokyo, Japan --.

Signed and Sealed this

Thirteenth Day of November 1984

[SEAL]

Attest:

GERALD J. MOSSINGHOFF

Attesting Officer

Commissioner of Patents and Trademarks